(12) United States Patent
Sealey et al.

(10) Patent No.: US 8,114,197 B2
(45) Date of Patent: Feb. 14, 2012

(54) FILTER MEDIA AND ARTICLES INCLUDING DENDRIMERS AND/OR OTHER COMPONENTS

(75) Inventors: David F. Sealey, Worcestershire (GB); Stuart Williams, Worcestershire (GB)

(73) Assignee: Hollingsworth & Vose Company, East Walpole, MA (US)

( * ) Notice: Subject to any disclaimer, the term of this patent is extended or adjusted under 35 U.S.C. 154(b) by 14 days.

(21) Appl. No.: 12/691,776

(22) Filed: Jan. 22, 2010

(65) Prior Publication Data

US 2011/0147320 A1 Jun. 23, 2011

Related U.S. Application Data

(60) Provisional application No. 61/289,128, filed on Dec. 22, 2009.

(51) Int. Cl.
*B01D 39/14* (2006.01)
(52) U.S. Cl. ............... 95/285; 55/524; 55/527; 442/79; 442/331
(58) Field of Classification Search ............ 55/522–528; 442/59–180, 327–417; 210/483–510.1
See application file for complete search history.

(56) References Cited

U.S. PATENT DOCUMENTS

| | | | |
|---|---|---|---|
| 5,344,956 A | 9/1994 | Allewaert et al. | |
| 5,580,459 A | 12/1996 | Powers et al. | |
| 5,672,399 A | 9/1997 | Kahlbaugh et al. | |
| 5,725,789 A | 3/1998 | Huber et al. | |
| 5,785,725 A | 7/1998 | Cusick et al. | |
| 5,861,319 A | 1/1999 | Lin et al. | |
| 5,912,332 A | 6/1999 | Agrawal et al. | |
| 6,037,444 A | 3/2000 | Rannard et al. | |
| 6,171,684 B1 | 1/2001 | Kahlbaugh et al. | |
| 6,547,859 B1 * | 4/2003 | Mullhaupt et al. | 96/4 |
| 6,933,252 B2 | 8/2005 | Pierce | |
| 6,977,122 B2 * | 12/2005 | Colombo et al. | 429/494 |
| 7,008,465 B2 | 3/2006 | Graham et al. | |
| 7,008,993 B1 | 3/2006 | Galen et al. | |
| 7,048,864 B2 | 5/2006 | King et al. | |

(Continued)

FOREIGN PATENT DOCUMENTS

EP 0 792 677 A1 9/1997

(Continued)

OTHER PUBLICATIONS

International Search Report and Written Opinion for Application No. PCT/US2010/61788 mailed Mar. 7, 2011.

*Primary Examiner* — Duane Smith
*Assistant Examiner* — Thomas McKenzie
(74) *Attorney, Agent, or Firm* — Wolf, Greenfield & Sacks, P.C.

(57) ABSTRACT

Articles such as filter media, which include dendrimers and/or other components, are provided. The filter media may further include a water repellant (e.g., a fluorinated species) to impart desirable properties to the media such as high water repellency. The filter media may also have a high efficiency as a function of pressure drop (i.e., high gamma values). In some embodiments, the filter media includes a fiber web which may be formed of various components such as glass fibers. The fiber web can also include additional components such as synthetic fibers, binder components, as well as other additives. The media may be incorporated into a variety of filter element products.

42 Claims, 1 Drawing Sheet

U.S. PATENT DOCUMENTS

| | | | |
|---|---|---|---|
| 7,137,510 B1 | 11/2006 | Klein et al. | |
| 7,235,290 B2 * | 6/2007 | Vallittu et al. | 428/296.7 |
| 7,314,497 B2 | 1/2008 | Kahlbaugh et al. | |
| 7,470,369 B2 | 12/2008 | Diallo | |
| 7,556,858 B2 | 7/2009 | Rasmussen et al. | |
| 7,601,849 B1 | 10/2009 | Jen et al. | |
| 7,682,994 B2 * | 3/2010 | Van Emden et al. | 442/181 |
| 2003/0005669 A1 * | 1/2003 | Maeoka et al. | 55/486 |
| 2003/0036085 A1 * | 2/2003 | Salinaro et al. | 435/6 |
| 2003/0167742 A1 | 9/2003 | Kahlbaugh et al. | |
| 2004/0020367 A1 * | 2/2004 | Soane et al. | 96/226 |
| 2004/0164018 A1 * | 8/2004 | Mitchell et al. | 210/502.1 |
| 2004/0224594 A1 | 11/2004 | Choi et al. | |
| 2005/0222320 A1 * | 10/2005 | Torres et al. | 524/556 |
| 2005/0247608 A1 | 11/2005 | Collias et al. | |
| 2006/0062982 A1 | 3/2006 | Cunningham et al. | |
| 2006/0068204 A1 | 3/2006 | Rasmussen et al. | |
| 2006/0096263 A1 * | 5/2006 | Kahlbaugh et al. | 55/527 |
| 2006/0157418 A1 | 7/2006 | Paleos et al. | |
| 2006/0188537 A1 | 8/2006 | Lamba-Kohli | |
| 2006/0207234 A1 * | 9/2006 | Ward et al. | 55/524 |
| 2006/0234210 A1 | 10/2006 | Kenan et al. | |
| 2006/0242933 A1 * | 11/2006 | Webb et al. | 55/486 |
| 2007/0082393 A1 | 4/2007 | Lodhi et al. | |
| 2008/0110822 A1 | 5/2008 | Chung et al. | |
| 2008/0221497 A1 | 9/2008 | Haik et al. | |
| 2009/0032475 A1 * | 2/2009 | Ferrer et al. | 210/799 |
| 2009/0139405 A1 | 6/2009 | Schwarz et al. | |
| 2009/0266048 A1 | 10/2009 | Schwarz | |

FOREIGN PATENT DOCUMENTS

| | | |
|---|---|---|
| WO | WO 00/53287 A1 | 9/2000 |
| WO | WO 00/70012 A1 | 11/2000 |
| WO | WO 2005/115496 A1 | 12/2005 |
| WO | WO 2009/048870 A1 | 4/2009 |

* cited by examiner

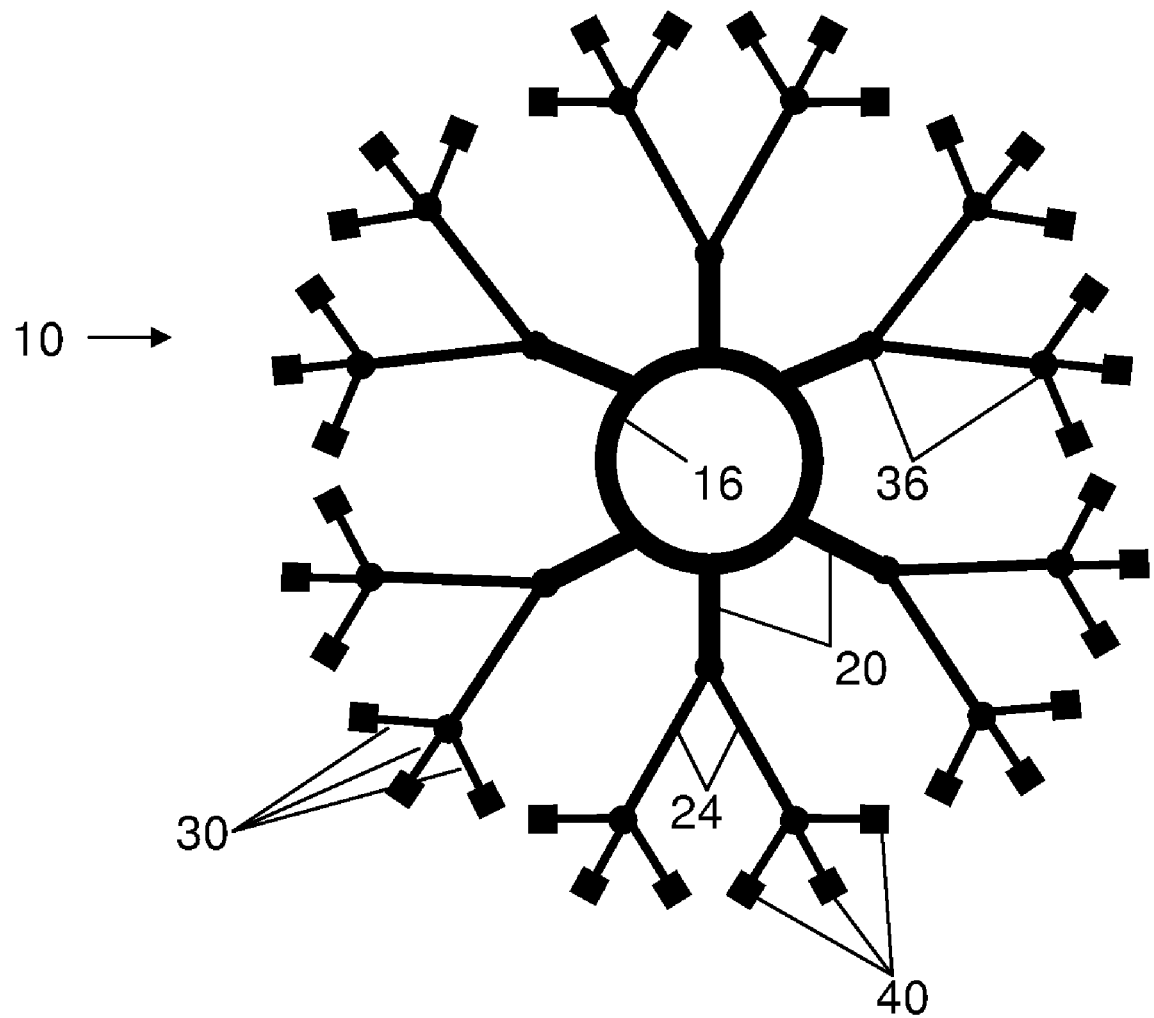

FILTER MEDIA AND ARTICLES INCLUDING DENDRIMERS AND/OR OTHER COMPONENTS

RELATED APPLICATIONS

This application claims priority to U.S. Provisional Application No. 61/289,128, filed Dec. 22, 2009, which is incorporated herein by reference in its entirety.

FIELD OF INVENTION

The present invention relates to filter media and articles including dendrimers and/or other components that may impart desirable performance characteristics.

BACKGROUND OF INVENTION

Filter media can be used to remove contamination in a variety of applications. In some cases, the filter media is formed of a web of fibers. The fiber web provides a porous structure that permits a fluid (e.g., a gas or a liquid) to flow through the filter media. Contaminant particles contained within the fluid may be trapped on the fibrous web. Depending on the application, the filter media may be designed to have different characteristics. Filter media characteristics, such as water repellency, pressure drop, surface area, and basis weight affect filter performance including filter efficiency and resistance to fluid flow through the filter. In general, higher filter efficiencies result in a higher resistance to fluid flow which leads to higher pressure drops for a given flow rate across the filter.

There is a need for filter media that have a desirable balance of properties including a high water repellency, a high efficiency, and a low resistance to fluid flow across the filter media.

SUMMARY OF INVENTION

Filter media and articles that include dendrimers and/or other components, and methods of forming such media and articles, are described herein.

In one set of embodiments, a series of articles are provided. In one embodiment, an article includes a fiber web comprising a dendrimer, a fluorinated polymer, and a plurality of glass fibers having an average diameter between about 0.01 and about 10 microns. The fiber web has a basis weight between about 30 and about 400 gsm, an overall thickness between about 100 microns and about 5000 microns, and an overall pressure drop between about 5 Pa and about 700 Pa.

In another embodiment, an article includes a fiber web comprising a dendrimer, a water repellant, and a plurality of glass fibers having an average diameter between about 0.01 and about 10 microns. The fiber web has a basis weight between about 30 and about 400 gsm, an overall thickness between about 100 microns and about 5000 microns, an overall pressure drop between about 5 Pa and about 700 Pa, and a water repellency of between about 1 kPa and about 20 kPa.

In another embodiment, an article includes a fiber web comprising a plurality of glass fibers having an average diameter between about 0.01 and about 10 microns and a water repellent comprising a fluorinated species comprising the formula $-C_nF_mR_y$, where n is an integer less than or equal to 6, m is an integer greater than 1, R is zero, an atom or a group of atoms, and y is an integer greater than or equal to 0. The fiber web has a basis weight between about 30 and about 400 gsm, an overall thickness between about 100 microns and about 5000 microns, an overall pressure drop between about 5 Pa and about 700 Pa, a water repellency between about 1 kPa and about 20 kPa, and a $-\log[(DOP\ penetration\ \%/100)/pressure\ drop,\ Pa)]\times 100\times 9.8$ value of at least 8, measured using DOP aerosol particles approximately 0.3 microns in diameter at a media face velocity of approximately 5.3 cm/sec.

In another embodiment, an article includes a fiber web comprising a plurality of glass fibers having an average diameter between about 0.01 and about 10 microns and a water repellent comprising a fluorinated species comprising the formula $-C_nF_mR_y$, where n is an integer less than or equal to 6, m is an integer greater than 1, R is zero, an atom or a group of atoms, and y is an integer greater than or equal to 0. The fiber web has a basis weight between about 30 and about 400 gsm, an overall thickness between about 100 microns and about 5000 microns, an overall pressure drop between about 5 Pa and about 700 Pa, a water repellency between about 1 kPa and about 20 kPa, and a $-\log[(DOP\ penetration\ \%/100)/pressure\ drop,\ Pa)]\times 100\times 9.8$ value of at least 8, measured using DOP aerosol particles approximately 0.18 microns in diameter at a media face velocity of approximately 2.5 cm/sec.

In another set of embodiments, a series of methods are provided. In one embodiment, a method includes passing a fluid through a filter media comprising a fiber web comprising a dendrimer, a fluorinated polymer, and a plurality of glass fibers having an average diameter between about 0.01 and about 10 microns. The fiber web has a basis weight between about 30 and about 400 gsm, an overall thickness between about 100 microns and about 5000 microns, and overall pressure drop between about 5 Pa and about 700 Pa.

Other aspects, embodiments, advantages and features of the invention will become apparent from the following detailed description.

BRIEF DESCRIPTION OF THE DRAWING

In the figures:
FIG. 1 is a schematic diagram of an example of a type of dendrimer.

DETAILED DESCRIPTION

Articles such as filter media, which include dendrimers and/or other components, are provided. The filter media may further include a water repellant (e.g., a fluorinated species) to impart desirable properties to the media such as high water repellency. The filter media may also have a high gamma value (i.e., a relationship between efficiency and pressure drop as described in more detail herein). In some embodiments, the filter media includes a fiber web which may be formed of various components such as glass fibers. The fiber web can also include additional components such as synthetic fibers, binder components, as well as other additives. The media may be incorporated into a variety of filter element products.

In certain embodiments, a filter media or other article includes a fiber web. The fiber web may be nonwoven. That is, the fiber web may be made using nonwoven processes such as a wet laid or dry laid process. Examples of fiber webs are provided in more detail below.

It should be understood that while filter media are primarily described herein, the articles and methods herein are not so limited and may find use in other applications. Accordingly, other articles may have one or more of the characteristics described herein.

In one set of embodiments, a filter media, fiber web, or other suitable article includes one or more dendrimers. Without wishing to be bound by any theory, the dendrimer may function as a surface modifier and, in some embodiments, may facilitate the attachment of other components such as water repellants (e.g., fluorinated species) and/or other additives to a fiber or fiber web. For instance, the dendrimer may form a first coating on a surface of a fiber, and may facilitate the attachment of a second coating of a different component (e.g., a water repellant, a fluorinated species, a polysiloxane, and/or a binder) on the first coating. Additional coatings are also possible, and may be in the form of monolayers or multilayers of the component. In some embodiments, the dendrimer forms a self-organized layer on a surface (e.g., a fiber surface) due to the dendrimer's high crystalline properties. This self-organization can facilitate the alignment or positioning of other components in an ordered fashion with respect to the surface. For instance, in one set of embodiments, dendrimers may form a self-organized layer on a fiber surface, the layer causing alignment of a flourinated species such that the fluorinated portion of the species extends away from the fiber surface and renders the fiber hydrophobic. Additionally or alternatively, the dendrimer, when combined with a second component, may form a single coating on a fiber surface including a mixture of the dendrimer and the second component. It should be understood that the coatings and/or layers described herein may be formed over all or only portions of a fiber surface, and that in some embodiments, not all fibers of a fiber web include such coatings and/or layers. Other configurations of a dendrimer (and an optional second, third, fourth, fifth, and/or sixth component) with respect to a fiber or fiber web are also possible.

In other embodiments, the dendrimer may not necessarily facilitate attachment of other components, but the dendrimer itself has properties that can impart desirable characteristics to a filter media, fiber web, or other article.

As is known to those of ordinary skill in the art, dendrimers (also known as "dendritic molecules" or "dendritic macromolecules") are molecules having branched repeating units that emanate radially from a core. As a result, molecular structures of dendrimers typically have a "tree-like" appearance. For example, as shown schematically in FIG. 1, an example of a type of dendrimer 10 includes a core 16 having a plurality of branches 20 extending from the core. Typically, the branches emanating from a core of a dendrimer have a repetitive generational structure, i.e., the branches are composed of various repeat units that multiply in a regular manner out from the core. Dendrimers can be referred to by "generation" number, where a 0-generation dendrimer is simply the core, a 1-generation dendrimer is the core surrounded by one layer of repeat units (or "branches"), and each successive generation represents the application of an additional "layer" of repeat units upon the pre-existing branches. In FIG. 1, core 16 forms the 0 generation, branches 20 form the first generation, branches 24 form the second generation, and branches 30 form the third generation.

Typically, the number of generations in the dendrimer is relatively small, e.g., a dendrimer may have 1, 2, 3, 4, 5, 6, or 7 generations of repeat units (i.e., generational numbers). However, dendrimers with a greater number of generations are also possible. The branches are usually formed of repeat units that multiply in number with each generation away from the core. (The repeat units themselves may be identified as being a moiety that cannot be further broken down into repeating units, as is well-known in the art.) Often, the repeat units of a branch are identical or at least substantially identical, although in some instances they need not be identical or substantially identical. The number of repeat units in a dendrimer is determined not only by the repeating pattern of the branches (i.e., each generation is double, triple, or quadruple that of the previous generation), but also by the structure of the core (which may support two, three, four, or more independent branches of repeat units). The point within the repeat unit which supports multiple repeat units of the next generation is called the "branch point," and may be a single atom (e.g., N, P, C, or Si), or a group of atoms (e.g., a benzene ring). For example, dendrimer 10 of FIG. 1 includes a plurality of branch points 36 which may be the same or different.

The dendrimer may have any suitable number of branches extending from a core or a branch point, for example, at least about 2, at least about 3, at least about 4, at least about 5, at least about 6, at least about 7, or at least about 8 branches extending from a core or a branch point. Higher generation branched groups may be the same or different as lower generation branched groups. For instance, the first generation branched groups may comprise a first structure and the second generation groups may comprise a second structure, wherein the first structure and the second structure are the same in some embodiments, and different in other embodiments. In some instances, each branch of a generation can have essentially the same structure (e.g., all branched groups in a first generation can have the same structure).

The dendrimer, including one or more branches or repeat units of the dendrimer, can include any suitable type of molecule. In some embodiments, the dendrimer comprises a polymeric or oligomeric group, such as an organic polymer or oligomer. The organic polymer or oligomeric group may be natural or synthetic. Non-limiting examples of suitable organic polymers include polyurethanes, poly(ethylene glycol), poly(lactic acid), polyesters, polyethylene terephthalate, polyvinyl chloride, polyvinyl acetate, polyether, poly(acrylic acid), or a copolymer thereof, all optionally substituted. In certain embodiments, the dendrimer includes a fluorinated polymer or oligomer (e.g., a fluorocarbon polymer), such as one described herein. In other embodiments, the dendrimer may include an inorganic polymer such as a silicon-based polymer, a polysiloxane, or a polysulfide. The polymer of a branch may be charged (e.g., anionic or cationic) or uncharged. The polymer may have a molecular weight of, for example, between about 200 g/mol and about 1,000,000 g/mol, between about 200 g/mol to about 100,000 g/mol, between about 200 and about 50,000 g/mol, between about 200 and about 10,000 g/mol, or between about 200 and about 5,000 g/mol. In some embodiments, a branched group or an endgroup may comprise a polymeric group.

A dendrimer may be appropriately functionalized to impart desirable characteristics to an article. For example, the dendrimer may be functionalized or derivatized to include compounds, functional groups, atoms, or materials that can alter or improve properties of the article. In some embodiments, the dendrimer may comprise functional groups selected to possess an affinity for a surface (e.g., a glass fiber surface) or to specifically interact with a surface to form a bond. For example, the dendrimer may include a functional group having a positive or partially positive charge which favorably interacts with a surface having a negative or partially negative charge. In some embodiments, the dendrimer may include compounds, atoms, or materials that can alter or improve properties such as compatibility or incompatibility with a medium (e.g., water repellency, water absorbance, water stability), hydrophilicity, hydrophobicity, and/or mechanical stability. For example, a hydrophobic species (e.g., a water repellant) or any other suitable component can be chemically bound to the dendrimer (e.g., through covalent or ionic bonds), adsorbed onto a dendrimer surface or layer, or can be physically trapped by the dendrimer.

A dendrimer may include one or more endgroups (i.e., terminal groups) positioned at or near the perimeter of the dendrimer, such as endgroups 40 in FIG. 1. The dendrimer may have any suitable number of endgroups extending from it, for example, at least about 3, at least about 5, at least about 10, at least about 15, at least about 20, at least about 30, at least about 40 endgroups, at least about 50 endgroups, at least about 60 endgroups, or at least about 70 endgroups. In other embodiments, a dendrimer may have greater than 70 endgroups. In some cases, each endgroup may be the same or different and is H, an alkyl, an alkenyl, an alkynyl, a heteroalkyl, a heteroalkenyl, a heteroalkynyl, a halide (e.g., a fluorine), an acyl, an aryl, a heteroaryl, or an amine, optionally substituted. In other cases, each endgroup may be the same or different and is a carboxyl, a carbonyl, a carboxylic acid, a carboxylate, a thiolcarbonyl, a thioester, a thioether, a thiolcarboxylic acid, an aldehyde, a ketone, an alkoxy, an aryloxy, an acyloxy, an aralkyl, an arylalkyl, a heterocycle, an amino, a methylol, a hydroxyalkyl, a mercaptoalkyl, a hydrocarbon, an isocyanate, a sulfate, a phosphate, an ester, an ether, a silane, a urethane, a carbonate, a thiol, a hydroxide, or a thiol-urethane, optionally substituted. An endgroup may be charged (e.g., anionic or cationic) or uncharged.

In some cases, a dendrimer has one or more endgroups that facilitates its attachment to a surface, such as a glass or modified glass surface. Additionally or alternatively, the dendrimer may have one or more endgroups that facilitates the attachment of a component such as a water repellent (e.g., a fluorinated species), a polysiloxane, a binder, and/or another component to the dendrimer. The dendrimer may be associated with a surface and/or a component by any suitable method such as by covalent bonding, ionic bonding, van der Waals interactions, hydrophobic interactions, hydrophilic interactions, chemical or physical adsorption, and combinations thereof.

In some embodiments, an endgroup comprises a moiety chosen to be able to crosslink, e.g., to form a dendrimer having an internally-crosslinked structure. Internal crosslinking can be facilitated, for example, by performing the crosslinking reaction under dilute concentrations of dendrimer such that the reaction conditions favor internal crosslinking rather than crosslinking with other dendrimers, or other components in a solution or suspension. In other embodiments, the endgroup comprises a moiety chosen to be able to crosslink with other dendrimers and/or components in a solution or suspension. The amount of crosslinking may be controlled, for instance, by controlling the number of crosslinkable groups in the dendrimer, and/or by controlling the amount of time or other reaction systems that cause crosslinkages to form. For example, in some embodiments, the endgroups may be linked together via double bonds. Such reactions are known to those of ordinary skill in the art, and can be monitored, for example, using MALDI-MS to determine when a suitable amount of crosslinking has occurred.

A dendrimer having any suitable size may be used with the articles described herein. For example, a dendrimer may have a size between about 0.5 nm and about 20 nm (e.g., between about 0.5 nm and about 15 nm, between about 0.5 nm and about 10 nm, between about 0.5 nm and about 5 nm) in diameter. Dendrimers having different sizes are also possible. The core and the repeat units may each independently be any suitable moiety. The core may be a relatively small moiety, e.g., having a molecular weight of less than about 100 Da or less than about 50 Da, although in some cases, the core may be larger, for example, less than about 1000 Da, e.g., between about 500 Da and about 1000 Da. The core is often chosen to be an entity that can react with one or more repeat units to form the branches of the dendrimer.

As described herein, any suitable type of dendrimer may be employed in the articles provided herein. Commercially available dendrimers such as those provided by Dendritic Nanotechnologies, Inc., Rudolf Gmbh, and others can be used in some embodiments.

A dendrimer may be incorporated into n filter media, fiber web, or other article by any suitable method. In one set of embodiments, a dendrimer is added to a binder resin. When added to a binder resin, the dendrimer may be between about 0.01% and about 75% (e.g., between about 1% and about 50%, between about 25% and about 50%, between about 1% and about 30%, between about 10% and about 25%) of the dry weight of the binder resin, i.e., the weight of the binder resin after water added during the fabrication process has been substantially removed. The dendrimer can also be incorporated into a filter media by other methods such as spraying, dipping, immersing, or other methods known in the art. In some embodiments, the dendrimer may be incorporated into the filter media before or after a binder resin is added.

Regardless of how a dendrimer is added, in general, the dendrimer, if present in the filter media, fiber web, or other article, may be between about 0.01% and about 10%, between about 0.01% and about 5%, between about 0.05% and about 3%, between about 0.1% and about 2%, or between about 0.2% and about 0.75% of the total dry weight of the filter media or article, i.e., the weight of the filter media after water added during the fabrication process has been substantially removed. The dendrimer may comprise less than about 10%, less than about 5%, less than about 3%, less than about 1.5%, or less than about 1.0% of the dry weight of the filter media or article. In some cases, the dendrimer comprises greater than about 1.0%, greater than about 1.5%, greater than about 3%, greater than about 5%, or greater than about 10% of the dry weight of the filter media or article.

In one set of embodiments, an article such as a filter media includes one or more fluorinated species. The fluorinated species may act as a water repellant in certain embodiments. A fluorinated species includes at least one fluorine atom, and may be in polymeric or non-polymeric form. A fluorinated polymer includes at least one fluorine atom and at least two repeat units. In some cases, the repeat units of the fluorinated polymer include at least one fluorine atom. Polymers include, for example, linear, branched, cyclic, saturated, and unsaturated polymers.

In some cases, the fluorinated species is highly fluorinated, i.e., at least about 30%, at least about 50%, at least about 70%, or at least about 90% of the hydrogen atoms of the species are replaced by fluorine atoms. The fluorinated species may comprise a fluorine to hydrogen ratio of, for example, at least about 0.2:1, at least about 0.5:1, at least about 1:1, at least about 2:1, at least about 5:1, or at least about 10:1. In some such embodiments, at least about 30%, at least about 50%, at least about 70%, or at least about 90% but less than 100% of the hydrogen atoms of the fluorinated species are replaced by fluorine atoms. In other cases, the fluorinated species is perfluorinated, i.e., the species contains fluorine atoms but contains no hydrogen atoms.

In some embodiments, a fluorinated species comprises two oligomeric (or polymeric) components including a fluorophilic component (e.g., component "A") and a hydrocarbon component (e.g., component "B"). These components may form a diblock-copolymer (e.g., an "A-B" structure) or other suitable structure. For example, a fluorophilic component may be one described herein, and the hydrocarbon component may include, for instance, an alkyl-containing or aromatic-containing component (including acrylate- or urethane-based components). Such components are known in the art and may be a part of the fluorinated species described herein.

In some embodiments, the fluorophilic component of a fluorinated species, or a fluorinated species itself, is a fluorinated oligomer or polymer. The fluorinated polymer may be a fluorocarbon polymer. In some embodiments, the fluorophilic component of a fluorinated species includes one or more fluorinated polymers, where the number of monomer units forming the fluorinated polymer is less than or equal to 10, less than or equal to 8, less than or equal to 6, less than or equal to 4, or less than or equal to 2. In certain embodiments, the fluorophilic component is a component where at least about 30%, at least about 50%, at least about 70%, or at least about 90% of the hydrogen atoms of the fluorophilic component are replaced by fluorine atoms. The fluorophilic component may comprise a fluorine to hydrogen ratio of, for example, at least about 0.2:1, at least about 0.5:1, at least about 1:1, at least about 2:1, at least about 5:1, or at least about 10:1. In some cases, the fluorophilic component is perfluorinated.

Non-limiting examples of types of fluorinated polymers or oligomers that can be included in a fluorinated species (e.g., in a fluorophilic chain and/or as side chains), include vinylidene fluoride (VDF), (per)fluoroolefins (e.g., tetrafluoroethylene (TFE)), chlorotrifluoroethylene (CTFE), (per)fluoroalkylvinylethers (PAVE), e.g., $CF_2=CFOR_f$, where $R_f$ is a (per)fluoroether or a $C_n$, (per)fluoroalkyl such as trifluoromethyl or pentafluoropropyl, where n is an integer; and perfluoro-oxyalkylvinylethers $CF_2=CFOR_x$, where x is a $C_1$-$C_{12}$ perfluoro-oxyalkyl having one or more ether groups, for example, perfluoro-2-propoxy-propyl. Other examples of monomers present within the fluorinated species include fluorinated acrylates and fluorinated methacrylates.

In some embodiments, a fluorinated polymer may include a (per)fluoropolyether chain. The (per)fluoropolyether chain may comprise repeating units including, but not limited to, $-(C_nF_{2n}O)_x-$, where n is an integer, for example, $-(C_3F_6O)_x-$, $-(C_4F_8O)_x-$, $-(C_5F_{10}O)_x-$; $-(CF(CF_3)CF_2O)_x-$; $-(CF_2CF_2O)_x-$; $-(CF(CF_3)CF_2O)_x-CF(CF_3)CONH-$; $-(CF_2(CF_2)_z-CF_2O)_x-$, where z' is an integer; $-(CFLO)_x-$, where L=F or $-CF_3$; and $-(CH_2CF_2O)_x-$. In some cases, $(C_nF_{2n+1}O)_x-$, where n is an integer (for example, $-(CF_3O)_x-$, $-(C_2F_5O)_x-$, $-(C_3F_7O)_x-$, etc.), is used as a terminal group and may not be polymerizable. In some cases, the (per)fluoropolyether chain may have the structure $(C_nF_mO)_x-$, where n and m are integers properly chosen to form a valid structure. In some embodiments, the fluorinated polymer comprises poly((per)fluoromethylene oxide), poly((per)fluoroethylene oxide), poly((per)fluoropropylene oxide), and/or poly((per)fluorobutylene oxide). In some embodiments, x in the structures above is less than or equal to 10. For example, x may be equal to 8, 6, 4, or 2. It should be appreciated that any other suitable fluorinated polymer, and/or combinations thereof may be used as appropriately in the articles and methods presented herein.

In some embodiments, the fluorinated species is a fluorocarbon polymer (also known as a fluorocarbon). In one embodiment, the fluorocarbon polymer used is a fluoroacrylate copolymer emulsion that includes a dipropylene glycol monomethyl ether. An example of a suitable fluorocarbon is the Asahi Guard AG 955 (product code #930078) from LJ Specialties Limited (Enterprise Drive, Holmewood Industrial Park, Holmewood, Chesterfield, Derbyshire, S42 5UW United Kingdom). Another example of a suitable fluorocarbon is a Repearl F-35 Fluorochemical from MIC Specialty Chemicals, Inc. (134 Mill Street, Tiverton, R.I. 02878). A further example of a suitable fluorocarbon is a Phobol 8195 from Huntsman International, Textile Effects (4050 Premier Drive, High Point, N.C. 27265). It should be appreciated that any other suitable fluorocarbon polymer, and/or combinations thereof may be used as appropriately in the articles and methods presented herein.

In some embodiments, the fluorinated species includes a chain comprising the formula $-C_nF_mR_y$, where n is an integer greater than 1, m is an integer greater than 1, R is zero, an atom or a group of atoms (e.g., hydrogen, oxygen, sulfur, nitrogen, carbon or an endgroup described herein), and y is an integer greater than or equal to 0. In some cases, n is an integer less than or equal to 8, and m is an integer greater than 1 (e.g., $-C_8F_{15}H_2$, $-C_8F_{16}H_1$, $-C_8F_{17}$). In other cases, n is an integer less than or equal to 6, and m is an integer greater than 1. For example, in one particular embodiment, a chain comprises the formula $-C_6F_{12}H_1$. In another example, a chain comprises the formula $-C_6F_{13}$. In some embodiments, n is an integer less than or equal to 4, and m is an integer greater than 1 (e.g., $-C_4F_7H_2$, $-C_4F_8H_1$, $-C_4F_9$). The chain may include, in some embodiments, the formula $-C_nF_{2n+1}$. In yet other embodiments, n is an integer greater than or equal to 6, and m is an integer greater than 1. Such chains comprising the formula $-C_nF_mR_y$ may be part of, for example, a fluoroacrylate polymer or other suitable polymer.

In some embodiments, a fluorinated species (e.g., a fluorinated polymer, or in some cases, a fluorocarbon polymer) is between about 0.01% and about 10%, between about 0.01% and 5%, between about 0.05% and about 3%, between about 0.1% and 2%, or between about 0.2% and about 0.75% of the total dry weight of the filter media or article. One or more fluorinated species may comprise less than about 10%, less than about 5%, less than about 3%, less than about 1.5%, or less than about 1.0%, of the total dry weight of the filter media or article. In other embodiments, the one or more fluorinated species may comprise greater than about 1.0%, greater than about 1.5%, greater than about 3%, greater than about 5%, or greater than about 10%, of the total dry weight of the filter media or article.

When a fluorinated species is added to a binder resin, it may be between about 0.01% and about 40% (e.g., between about 1% and about 30%, between about 10% and about 25%) of the dry weight of the binder resin. It should be appreciated, however, that a fluorinated species need not be added to a binder resin, but may be incorporated into a filter media by other methods. For instance, the fluorinated species can also be incorporated into a filter media by methods such as spraying, dipping, immersing, or by other methods known in the art. In some embodiments, the fluorinated species may be incorporated into the filter media before or after a binder resin is added.

As noted above, an article such as a filter media may include one or more water repellants. The water repellant can have any suitable form and may include a fluorinated or a non-fluorinated species as described herein. The water repellent may function as a fiber surface modifier, reducing surface tension of the fiber and increasing the contact angle between the fiber and water droplets.

The water repellant, when added to a binder resin, may be between about 0.01% and about 40% (e.g., between about 1% and about 30%, between about 10% and about 25%) of the dry weight of the binder resin. It should be appreciated, however, that a water repellent need not be added to a binder resin, but may be incorporated into a filter media by other methods.

For instance, the water repellent can also be incorporated into a filter media by methods such as spraying, dipping, immersing, or by other methods known in the art. In some embodiments, the water repellent may be incorporated into the filter media before or after a binder resin is added.

Regardless of how a water repellant is added, in general, the water repellent, if present in the filter media, fiber web, or other article, may be between about 0.01% and 10%, between about 0.01% and about 5%, between about 0.05% and about 3%, between about 0.1% and about 2%, or between about 0.2% and about 0.75% of the total dry weight of the filter media or article. The water repellant may comprise less than about 10%, less than about 5%, less than about 3%, less than about 1.5%, or less than about 1.0% of the dry weight of the filter media or article. In some cases, the water repellant comprises greater than about 1.0%, greater than about 1.5%, greater than about 3%, greater than about 5%, or greater than about 10% of the dry weight of the filter media or article.

A variety of water repellants can be used in the articles described herein. Non-limiting examples of suitable water repelling agents include silanes, siloxanes, silicones, alkylketene dimers (AKDs), and fluorinated species such as those described herein, e.g., polytetrafluoroethylene (PTFE), slightly cationic perfluoroalkyl acrylic ester polymer lattices, e.g., FC-280, FC-6101 or FC-5102 (Commercial Chemical Division, 3M, 223-6SE, 3M Center, St. Paul, Minn., 55144), Aquafilm T (C.N.C. International, Inc., 20 Privilege Street, Woonsocket, R.I., 02895) or non-ionic perfluoroalkyl acrylic ester polymer lattices, such as Zonyl NWA (DuPont Performance Chemicals, Chamber Works Deepwater, N.J., 02895), and derivatives thereof.

In certain embodiments, the filter media, fiber web, or other article comprises an additional additive such as a polysiloxane. The polysiloxane or other additive may aid in imparting the filter media or article with desirable properties (e.g., high efficiency as a function of pressure drop), e.g., when used in combination with a fluorinated species and/or a dendrimer. In some embodiments, the polysiloxane is a polyfunctional aminosiloxane, though other suitable siloxane compositions may also be used. An example of a suitable polysiloxane is Synthebond SF-30 from Hexion Specialty Chemicals (200 Railroad St. Roebuck, S.C. 29376). Another example of a suitable polysiloxane is Ultratex FMW Silicone Softener from Huntsman International, Textile Effects.

In some embodiments, the polysiloxane may comprise less than about 1.5%, less than about 1.2%, or less than about 1.0% of the dry weight of the filter media. In some embodiments, the polysiloxane may be greater than about 0.1% of the dry weight of the filter media. For example, the polysiloxane may comprise between about 0.1% and about 1.0% of the dry weight of the filter media, or between about 0.1% and about 0.5% of the dry weight of the filter media. The polysiloxane, when added to a binder resin, may be between about 0.01% and about 40% (e.g., between about 0.5% and about 30%, between about 0.5% and about 20%, or between about 10% and about 25%) of the dry weight of the binder resin. In certain embodiments, a polysiloxane is added after a binder has been added to form an article, as described in more detail below.

A filter media may include a binder resin, which may include a binder and optionally one or more additives or other components described herein. In certain embodiments, a binder forms at least 60%, at least 70%, or at least 80% of the total dry weight of the binder resin, the remaining portion being formed of one or more additives or other components.

The binder, if present in the filter media, typically comprises a small weight percentage of the filter media. For example, the binder may comprise less than about 20% (e.g., between 2% and 20%, between 10% and 20%), less than about 10% (e.g., between 2% and 10%, between 5% and 10%), or less than about 5% (e.g., between 2% and 5%) of the total dry weight of the filter media. As described further below, the binder may be added to the fibers in the wet fiber web state. In some embodiments, the binder coats the fibers and is used to adhere fibers to each other to facilitate adhesion between the fibers.

In general, the binder may have any suitable composition. In some embodiments, the binder is resin-based. In other embodiments, the binder is in the form of a binder fiber. In yet other embodiments, the binder includes a combination of a binder resin and a binder fiber. The binder fibers may form any suitable amount of the binder. For example, binder fibers may form greater than about 10%, greater than about 20%, greater than about 40%, greater than about 60%, or greater than about 80% of the total dry weight of the binder. In some cases, binder fibers form from about 10% to about 90%, from about 20% to about 80%, or from about 20% to about 60% of the total dry weight of the binder. Other percentages and ranges are also possible.

The binder may be in the form of one or more components. In some embodiments, the binder includes a soft binder and a hard binder. Though, it should be understood that not all embodiments include all of these components (e.g., hard binder) and that other appropriate binders may be used.

Soft binders are known to those of skill in the art and generally refer to a binder having a relatively low glass transition temperature. In some embodiments, a soft binder may have a glass transition temperature less than about 15° C. In some embodiments, a soft binder will have a glass transition temperature within a range of between about 0° C. and about 2° C. One suitable soft binder is acrylic, though it should be understood that other compositions may also be suitable, such as for example, polyester, polyolefin, and polyurethane. When present, the soft binder may be one of the larger components of the binder. For example, the soft binder may comprise greater than about 40%, or greater than about 50%, of the total weight of the binder. In some embodiments, the soft binder may comprise between about 50% and about 80% by weight, or between about 50% and about 55% by weight of the binder. In some cases, the soft binder may make up the entire binder. In other embodiments, no soft binder is present.

Hard binders are known to those of skill in the art and generally refer to a binder having a relatively high glass transition temperature. When used together in a binder resin, a hard binder will have a greater glass transition temperature than a soft binder. In some cases, a hard binder will have a glass transition temperature within a range of between about 25° C. and about 35° C. In one embodiment, a hard binder will have a glass transition temperature of about 30° C. For example, the hard binder may be a polyvinyl acetate, polyvinyl alcohol, polyacrylic acid, acrylic, styrene, styrene acrylic, and/or combinations thereof. Other compositions may also be suitable.

When present, the percentage of hard binder within the web may be lower than the percentage of soft binder within the web. However, in other cases, the percentage of hard binder may be higher than, or approximately equal to, the percentage of soft binder. For example, the hard binder may comprise less than about 40%, or less than about 30%, of the total weight of the binder. For example, the hard binder may comprise between about 25% and about 35% by total weight of the binder. In some embodiments, the percentage of hard binder in the binder is between about 8% by weight and about 10% by weight. In some embodiments, no hard binder is present.

In addition to the binder, additional components, and/or glass fibers described herein, the filter media, fiber web, or other article may include a variety of other suitable additives (typically, in small weight percentages) such as surfactants, coupling agents, crosslinking agents, amongst others.

In some embodiments, the filter media, fiber web, or other article includes one or more surfactants. Suitable surfactants include nonionic, amphoteric, anionic and cationic surfactants known to those skilled in the art. Illustrative examples of suitable surfactants include fluoroaliphatic surfactants, e.g., perfluoroalkyl polyalkylene oxides; and other surfactants, e.g., actylphenoxypolyethyoxy ethanol nonionic surfactants, alkylaryl polyether alcohols, and polyethylene oxides. Commercially available surfactants that may be suitable for the present invention include various poly(ethylene oxide) based surfactants available under the tradename Triton, e.g., grade X-102, from Rohm and Haas Corp; various polyethylene glycol based surfactants available under the tradename Emerest, e.g., grades 2620 and 2650, from Emery Industries; polyalkylene oxide fatty acid derivatives available under the tradename PEG, e.g., PEG 400, which are available from ICI; sorbitan monooleate, e.g., Span 80, which is available from ICI; ethoxylated hydroxylated castor oil, e.g., G1292, which is available from ICI; a mixture of sorbitan monooleate and ethoxylated hydroxylated castor oil, e.g., Ahcovel Base N62, which is available from ICI; polyoxyalkylene modified fluoroaliphatic surfactants which are available, e.g., from Minnesota Mining and Manufacturing Co.; amphoteric-modified ethoxylated alkylamines, such as Schercopol DS-120 (Scher Chemicals, Inc., P.O. Box 4317, Clifton, N.J., 07012); non-ionic-polyethoxylene(2) sorbitan monooleate, such as Alkonal 6112 (DuPont, Chemicals and Pigments Division, Performance Products, Wilmington, Del., 19898), and mixtures thereof.

The surfactant may be used to improve the dispersion of fibers in water and/or to improve the stability of the resin formulations. In general, the surfactant, if present in the filter media, is between about $1 \times 10^{-5}$ and 1.0%, preferably between about $5.0 \times 10^{-5}$ and about 0.1%, and most preferably between about $1 \times 10^{-4}$ and about 0.005% of the total dry weight of the filter media.

Coupling agents can also be added to the filter media. Suitable coupling agents include organofunctional silanes, such as amino functional silanes, Z-6020, Z-6026, Z-6030 and Z-6032, carboxy functional silanes, such as Z-6030, or epoxy functional silanes, such as Z-6040 (Dow Corning Corporation, Midland, Mich., 48686-0994). Generally, if a coupling agent is present, it is added in amount between about 0.01% and about 1.0% of the total dry weight of the filter media. The coupling agent may be used to strengthen the filter media.

A crosslinking resin can, optionally, be added to the filter media. A typical crosslinking resin is melamine-formaldehyde, such as Berset 2003 (Bercen, Inc., Cranston Street, Cranston, R.I., 02920-6789). The crosslinking agent, if present, is found in the filter media in a range of between about 0.01% and about 2.0% of the total dry weight of the filter media. The crosslinking agent may be used to strengthen the filter media.

It should be understood that the filter media and other articles are not limited to the above-noted components and weight percentages. Other binder components, additional components, and weight percentages are possible.

As noted above, a filter media or other article described herein may include a fiber web in some embodiments. The fiber web of the filter media may include a large percentage of glass fiber. For example, the glass fibers may comprise at least about 70%, at least about 80%, or at least about 90%, of the total dry weight of the filter media. In some embodiments, the fiber web includes between about 90% and about 95% by weight of the glass fibers. It should be understood that, in certain embodiments, the fiber web may not include glass fiber within the above-noted ranges or at all.

The glass fibers of a fiber web may have any suitable average fiber diameter and may depend on the type of glass fiber used. In some embodiments, the glass fibers have an average fiber diameter of at least 5.0 microns, at least 10.0 microns, or at least 15.0 microns. The average fiber diameter may be up to about 30.0 microns in some cases. In certain embodiments, the glass fibers have an average fiber diameter between about 0.1 microns and about 30.0 microns (e.g., between about 1.0 micron and about 20.0 microns, between about 5.0 microns and 15.0 microns, or between about 6.0 microns and 12.0 microns). In some instances, the glass fibers can have small average diameters such as less than about 10.0 microns. For example, the average diameter may be between about 0.01 microns to about 10.0 microns; in some embodiments, between about 0.4 microns and about 8.0 microns; and in certain embodiments, between about 0.3 microns and about 6.5 microns (e.g., between 1.0 microns and 5.0 microns, between about 0.4 microns and 4.0 microns, between about 0.3 microns and about 3.0 microns, or between about 0.2 microns and 2.0 microns). Other diameters and ranges are also possible.

Average diameters of the glass fibers may have any suitable distribution. In some embodiments, the diameters of the fibers are substantially the same. In other embodiments, average diameter distribution for glass fibers may be log-normal. However, it can be appreciated that glass fibers may be provided in any other appropriate average diameter distribution (e.g., a Gaussian distribution, a bimodal distribution).

The glass fibers may vary significantly in length as a result of process variations. For instance, glass fibers may have a length in the range of between about 0.125 inches and about 1 inch (e.g., about 0.25 inches, or about 0.5 inches). The aspect ratios (length to diameter ratio) of the glass fibers may be generally in the range of about 100 to about 10,000. In some embodiments, the aspect ratio of the glass fibers may be in the range of about 200 to about 2500; or, in the range of about 300 to about 600. In some embodiments, the average aspect ratio of the glass fibers may be about 1,000; or about 300. It should be appreciated that the above-noted dimensions are not limiting and that the microglass fibers may also have other dimensions.

Average lengths of the glass fibers may have any suitable distribution. In some embodiments, the lengths of the fibers are substantially the same. In other embodiments, average length distribution for glass fibers may be log-normal. However, it can be appreciated that glass fibers may be provided in any other appropriate average length distribution (e.g., a Gaussian distribution, a bimodal distribution).

Examples of glass fibers that may have the above-mentioned properties include chopped strand glass fibers and microglass fibers. In some embodiments, the fiber web has a combination of chopped strand glass fibers and microglass fibers. Chopped strand glass fibers and microglass fibers are known to those skilled in the art. One skilled in the art is able to determine whether a glass fiber is chopped strand or microglass by observation (e.g., optical microscopy, electron microscopy). Chopped strand glass may also have chemical differences from microglass fibers. In some cases, though not required, chopped strand glass fibers may contain a greater content of calcium or sodium than microglass fibers. For example, chopped strand glass fibers may be close to alkali free with high calcium oxide and alumina content. Microglass fibers may contain 10-15% alkali (e.g., sodium, magnesium oxides) and have relatively lower melting and processing temperatures. The terms refer to the technique(s) used to manufacture the glass fibers. Such techniques impart the glass fibers with certain characteristics. In general, chopped strand glass fibers are drawn from bushing tips and cut into fibers. Microglass fibers are drawn from bushing tips and further subjected to flame blowing or rotary spinning processes. In some cases, fine microglass fibers may be made using a remelting process. In this respect, microglass fibers may be fine or coarse. Chopped strand glass fibers are produced in a more controlled manner than microglass fibers, and as a result, chopped strand glass fibers will generally have less variation in fiber diameter and length than microglass fibers.

In some embodiments, the microglass fibers can have small diameters such as less than about 10.0 microns. For example, the diameter may be between about 0.1 microns and about 9.0 microns; in some embodiments, between about 0.3 microns and about 6.5 microns; and in some embodiments, between about 0.3 microns and about 3.0 microns. In some embodiments, average diameter distributions for microglass fibers may be log-normal. However, it can be appreciated that microglass fibers may be provided in any other appropriate average diameter distribution (e.g., a Gaussian distribution, a bimodal distribution).

As noted above, microglass fibers may be fine or coarse. As used herein, fine microglass fibers are less than about 1 micron in diameter and coarse microglass fibers are greater than or equal to about 1 micron in diameter.

The microglass fibers may vary significantly in length as a result of process variations. The aspect ratios (length to diameter ratio) of the microglass fibers may be generally in the range of about 100 to about 10,000. In some embodiments, the aspect ratio of the microglass fibers may be in the range of about 200 to about 2500; or, in the range of about 300 to about 600. In some embodiments, the average aspect ratio of the microglass fibers may be about 1,000; or about 300. It should be appreciated that the above-noted dimensions are not limiting and that the microglass fibers may also have other dimensions. In some embodiments, average length distributions for microglass fibers may be log-normal. Though, in other embodiments, microglass fibers may be provided in any appropriate average length distribution (e.g., a Gaussian distribution, a bimodal distribution).

The chopped strand glass fibers may have an average fiber diameter that is greater than the diameter of the microglass fibers. In some embodiments, the chopped strand glass fiber has a diameter of greater than about 5 microns. For example, the diameter range may be up to about 30 microns. In some embodiments, the chopped strand glass fibers may have a fiber diameter between about 5 microns and about 12 microns. In one embodiment, the chopped strand glass fibers may have an average fiber diameter of about 6.5 microns. In some embodiments, the diameters of the chopped strand glass fibers are substantially the same.

In some embodiments, chopped strand glass fibers may have a length in the range of between about 0.125 inches and about 1 inch (e.g., about 0.25 inches, or about 0.5 inches). In some embodiments, the lengths of the chopped strand glass fibers are substantially the same.

It should be appreciated that the above-noted dimensions are not limiting and that the microglass and chopped strand fibers may also have other dimensions.

In some embodiments, the chopped strand glass fibers may have an organic surface finish. Such a surface finish can, for example, enhance dispersion of the fibers during processing. In various embodiments, the surface finish may include starch, polyvinyl alcohol, or other suitable finishes. In some cases, the surface finish may be applied as a coating as the chopped strand glass fibers are extruded during production.

The ratio between the weight percentage of chopped strand glass fibers and microglass fibers provides for different characteristics in the filter media. In general, increasing the percentage of fine glass fibers will increase the overall surface area of the filter media; and, decreasing the percentage of coarse glass fibers will decrease the overall surface area of the filter media. Thus, in general, increasing the amount of chopped strand glass fibers as compared to the amount of microglass fibers decreases the overall surface area of the filter media; and, increasing the amount of microglass fibers as compared to the amount of chopped strand glass fibers increases the surface area of the filter media. Increasing the amount of chopped strand glass fibers within the filter media also increases the pleatability of the filter media (i.e., the ability of a filter to be pleated).

The percentage of chopped strand glass fibers and microglass fibers (e.g., coarse and/or fine) within the filter media are selected to provide desired characteristics.

Various percentages of chopped strand glass fibers can be included within the glass fibers in the web. In some embodiments, chopped strand glass fibers may make up less than about 80% by weight of the glass fiber in the web, less than about 75% by weight of the glass fiber in the web, less than about 55% by weight of the glass fiber in the web, less than about 40% by weight of the glass fiber in the web, or less than about 20% by weight of the glass fiber in the web. In some cases, chopped strand glass fibers may make up between about 0% by weight and about 80% by weight of the glass fibers. For example, chopped strand glass fibers may make up between about 1% by weight and about 50% by weight of the glass fibers, between about 3% by weight and about 35% by weight of the glass fibers, or between about 3% by weight and 25% by weight of the glass fibers. In certain embodiments, substantially all of the glass fibers in the web are chopped strand glass fibers.

Additionally, different percentages of microglass fibers are included within the glass fibers within the web. In some embodiments, microglass fibers may make up greater than about 45% by weight of the glass fibers, greater than about 60% by weight of the glass fiber web, or greater than about 80% by weight of the glass fibers. In some cases, microglass fibers may make up between about 45% by weight and about 97% by weight of the glass fibers. For example, microglass fibers may make up between about 85% by weight and about 95% by weight of the glass fibers, between about 88% by weight and about 92% by weight of the glass fibers, between about 65% by weight and 97% by weight of the glass fibers, or between about 65% by weight and 75% by weight of the glass fibers.

Coarse microglass fibers, fine microglass fibers, or a combination of microglass fibers thereof may be included within the glass fibers of the web. For coarse microglass fibers, in some embodiments, coarse microglass fibers may make up between about 40% and about 90% of the total weight of the fibers of the web. In some cases, coarse microglass fibers may make up between about 75% and about 90% of the total weight of the fibers, or between about 60% and about 70% of the total weight of the fibers. For fine microglass fibers, in some embodiments, fine microglass fibers make up between about 0% and about 25% by total weight of the fibers of the web. In some cases, for example, fine microglass fibers make up between about 5% and about 10% of the total weight of the fibers, or between about 2% and about 12% of the total weight of the fibers.

In some embodiments, glass fibers having a fiber diameter greater than or equal to about 6 microns may make up less than about 55% by weight of the glass fibers, less than about 40% by weight of the glass fibers, or less than about 20% by weight of the glass fibers. In some cases, glass fibers having a fiber diameter greater than or equal to about 6 microns may make up between about 5% by weight and about 55% by weight of the glass fibers. For example, glass fibers having a fiber diameter greater than or equal to about 6 microns may make up between about 5% by weight and about 15% by weight of the glass fibers, between about 8% by weight and about 12% by weight of the glass fibers, or between about 25% by weight and 35% by weight of the glass fibers.

In some embodiments, glass fibers having a fiber diameter less than about 6 microns may make up greater than about 45% by weight of the glass fibers, greater than about 60% by weight of the glass fibers, or greater than about 80% by weight of the glass fibers. In some cases, glass fibers having a fiber diameter less than about 6 microns may make up between about 45% by weight and about 95% by weight of the glass fibers. For example, glass fibers having a fiber diameter less than about 6 microns may make up between about 85% by weight and about 95% by weight of the glass fibers, between about 88% by weight and about 92% by weight of the glass fibers, or between about 65% by weight and 75% by weight of the glass fibers.

In addition to glass fibers, the filter media may also include other components including synthetic fibers. The synthetic fibers may comprise a small weight percentage of the filter media in certain embodiments. For example, the synthetic fibers may comprise less than about 50%, less than about 40%, less than about 25%, less than about 15%, or less than about 5% (e.g., 2%, 3%) of the total dry weight of the filter media. It should be understood that it may also be possible for synthetic fibers to be incorporated within the filter media outside of the ranges disclosed. The synthetic fibers may enhance adhesion of the glass fibers within the web during processing. Synthetic fibers may be, for example, binder fibers and/or staple fibers.

In general, the synthetic fibers may have any suitable composition. Non-limiting examples of materials that can be used to form synthetic fibers include rayon, aramide, polyolefins (e.g., polyethylene, polypropylene, polybutylene, and copolymers thereof), polytetrafluoroethylene, polyesters (e.g., polyethylene terephthalate, polyvinyl acetate, polyvinyl chloride acetate, polyvinyl butyral), acrylic resins (e.g., polyacrylate, and polymethylacrylate, polymethylmethacrylate), polyamides, nylon, polyvinyl chloride, polyvinylidene chloride, polystyrene, polyvinyl alcohol, polyurethanes, cellulosic or regenerated cellulosic resins (e.g., cellulosic nitrate, cellulosic acetate, cellulosic acetate butyrate, ethyl cellulose), and copolymers of the above materials. It should be appreciated that other suitable synthetic fibers may also be used. In some cases, the synthetic fibers comprise a thermoplastic polymer.

It should be appreciated that the filter media, fiber web, or other article may include more than one layer, e.g., at least 2, at least 3, at least 4, or at least 6 layers. Additional layers may also be included. Furthermore, all or some of the layers may be the same or different.

The filter media, fiber web, or other article (including one or more layers thereof) having one or more of the features described herein may be characterized by properties such as surface area, basis weight, and thickness.

The surface area of the filter media, fiber web, or other article may vary depending on the particular application and method of use of the media or article. The surface area may be less than about 1.8 $m^2/g$. In some embodiments, the surface area may be less than about 1.6 $m^2/g$, less than about 1.4 $m^2/g$, less than about 1.2 $m^2/g$, less than about 1.1 $m^2/g$, less than about 1.0 $m^2/g$, less than about 0.8 $m^2/g$, less than about 0.6 $m^2/g$, less than about 0.5 $m^2/g$, less than about 0.4 $m^2/g$, or less than about 0.2 $m^2/g$. In one embodiment, the surface area may be about 0.1 $m^2/g$ or greater. It should be understood that the surface area may be between any of the above noted upper and lower limits. For example, the surface area may be between about 0.2 $m^2/g$ and about 1.8 $m^2/g$, between about 0.1 $m^2/g$ and about 0.5 $m^2/g$, between about 0.2 $m^2/g$ and about 0.8 $m^2/g$, between about 0.5 $m^2/g$ and about 1.2 $m^2/g$, or between about 1.0 $m^2/g$ and about 1.8 $m^2/g$. As determined herein, surface area is measured through use of a standard BET surface area measurement technique. The BET surface area is measured according to section 10 of Battery Council International Standard BCIS-03A, "Recommended Battery Materials Specifications Valve Regulated Recombinant Batteries", section 10 being "Standard Test Method for Surface Area of Recombinant Battery Separator Mat". Following this technique, the BET surface area is measured via adsorption analysis using a BET surface analyzer (e.g., Micromeritics Gemini II 2370 Surface Area Analyzer) with nitrogen gas; the sample amount is between 0.5 and 0.6 grams in a ¾" tube; and, the sample is allowed to degas at 75° C. for a minimum of 3 hours.

In some embodiments, the overall basis weight of the filter media, fiber web, or other article may range from between about 10 grams per square meter (gsm) and about 1000 gsm, between about 25 gsm and about 500 gsm, between about 30 gsm and about 400 gsm, between about 25 gsm and about 150 gsm, or between about 55 gsm and about 85 gsm. The basis weight of a single layer of the filter media, fiber web, or other article may be, for example, between about 10 gsm and about 150 gsm, between about 50 gsm and about 150 gsm, or between about 60 gsm and about 100 gsm. As determined herein, the basis weight of the filter media, fiber web, or a layer thereof is measured according to TAPPI Standard T410. The values are expressed in grams per square meter or pounds per 3,000 square feet. Basis weight can generally be measured on a laboratory balance that is accurate to 0.1 grams. A preferred size is 95 square inches of area.

In some embodiments, the overall thickness of the filter media, fiber web, or article may range from between about 100 microns and about 5000 microns (e.g., between about 100 microns and about 2000 microns, between about 350 microns and about 1000 microns). The thickness of a single layer of the filter media or fiber web may be, for example, between about 100 microns and about 1000 microns (e.g., between about 400 microns and about 700 microns). As determined herein, the thickness is measured according to TAPPI Standard T411. Following this technique, a motorized caliper gauge TMI gage 49-70 can be used which has a pressure foot of 0.63 inch (16.0 mm) diameter and exerts a load of 0.3 psi (2 kPa).

The filter media or fiber web may be further characterized by other properties. Penetration, often expressed as a percentage, is defined as follows:

$$Pen = C/C_0$$

where C is the particle concentration after passage through the filter and $C_0$ is the particle concentration before passage through the filter. Typical tests of penetration involve blowing dioctyl phthalate (DOP) particles through a filter media or fiber web and measuring the percentage of particles that penetrate through the filter media or fiber web. In some embodiments, the DOP penetration test involves exposing the filter media or fiber web to DOP aerosol particles approximately 0.3 microns in diameter at a media face velocity of approximately 5.3 cm/sec. The media face velocity is the velocity of air as it hits the upstream side of the filter media. The DOP penetration measured under these test conditions can be determined using any suitable instrument, such as a TDA100P Penetrometer. These test conditions may be suitable for certain ASHRAE and HEPA filtration applications. In other embodiments, the DOP penetration test involves exposing the filter media or fiber web to DOP aerosol particles approximately 0.18 microns in diameter at a media face velocity of approximately 2.5 cm/sec. The DOP penetration measured under these test conditions can be determined using any suitable instrument, such as a TSI 8140 Penetrometer. These test conditions may be suitable for certain HEPA and ULPA filtration applications. Unless otherwise stated, the DOP penetration values (and gamma values) described herein are determined using the DOP penetration test involving exposing the filter media or fiber web to DOP aerosol particles approximately 0.3 microns in diameter at a media face velocity of approximately 5.3 cm/sec.

The pressure drop, also referred to as flow resistance, across the filter media or fiber web is measured based on the above DOP penetration tests. The pressure drop across the filter media or fiber web may vary depending on the particular application of the filter media. In some embodiments, for example, the overall pressure drop across the filter media or fiber web may range from between about 5 and about 700 Pa, between about 8 and 650 Pa, between about 10 and 500 Pa, or between about 10 and 400 Pa. The pressure drop is measured as the differential pressure across the filter media when exposed to a media face velocity of approximately 5.3 centimeters per second, or a media face velocity of approximately 2.5 centimeters per second (corrected for standard conditions of temperature and pressure). As noted above, the media face velocity is the velocity of air as it hits the upstream side of the filter media. Values of pressure drop are typically recorded as millimeters of water or Pascals. The values of pressure drop described herein were determined according to British Standard BS6410:1991. The measurements involved subjecting the upstream face of a filter media to an airflow of 32 L/min over a 100 cm² face area of the filter media, giving a media face velocity of 5.3 cm/s. Unless otherwise stated, the pressure drop values described herein are determined using a media face velocity of approximately 5.3 cm/sec.

Filter efficiency is defined as:

100-% Penetration

Because it may be desirable to rate filter media or fiber webs based on the relationship between penetration and pressure drop across the media, or efficiency as a function of pressure drop across the media or web, filters may be rated according to a value termed gamma value. Generally, higher gamma values are indicative of better filter performance, i.e., a high efficiency as a function of pressure drop. Gamma value is expressed according to the following formula:

gamma=(−log(DOP penetration %/100)/pressure drop, Pa)×100×9.8, which is equivalent to:

gamma=(−log(DOP penetration %/100)/pressure drop, mm H₂O)×100

As discussed above, the DOP penetration percentage is based on the percentage of particles that penetrate through the filter media or fiber web. With decreased DOP penetration percentage (i.e., increased efficiency) where particles are less able to penetrate through the filter media or fiber web, gamma increases. With decreased pressure drop (i.e., low resistance to fluid flow across the filter), gamma increases. These generalized relationships between DOP penetration, pressure drop, and/or gamma assume that the other properties remain constant.

The filter media or fiber web described herein may have high values of (−log(DOP penetration %/100)/pressure drop, Pa)×100×9.8; that is, high gamma values. In some embodiments, the values of (−log(DOP penetration %/100)/pressure drop, Pa)×100×9.8 for the filter media or fiber web are greater than about 10.5, greater than about 11.5, greater than about 12, greater than about 13, greater than about 14, or greater than about 15. In some embodiments, for example, the values of (−log(DOP penetration %/100)/pressure drop, Pa)×100×9.8 may be between about 1 and about 30, between about 8 and about 20, between about 8 and about 16, or between about 10.5 and about 14. Gamma is calculated based on measurements taken of a filter media subject to the DOP penetration and pressure drop tests described herein.

The filter media, fiber web, or other article may have various ranges of water repellency. The water repellency of a filter media may range, for example, between about 1 and about 20 kPa, between about 1 and about 17 kPa, between about 1 and about 15 kPa, between about 1 and about 7 kPa, between about 5 kPa and about 10 kPa, between about 9.5 and about 20 kPa, or between about 12 and about 17 kPa. In some embodiments, the water repellency is greater than about 1.5 kPa, greater than about 5 kPa, greater than about 9.5 kPa, greater than about 10 kPa, greater than about 12 kPa, or greater than about 15 kPa. As used herein, water repellency is measured using the Hydrostatic Head Test (HHT), which determines the height of water which the media will support before a predetermined amount of liquid passes through. A media with a higher hydrostatic head reading indicates it has a greater barrier to liquid penetration than a media with a lower hydrostatic head. The hydrostatic pressure test is performed according to the standard BS EN 20811:1992 (British); EN 20811:1992 and ISO 811:1981 (International) for determining resistance to water penetration.

In certain embodiments, the filter media or fiber web includes a water repellency in a range described above, but is not oil repellent or is slightly hydrophobic (e.g., the filter media or fiber web may have a relatively low water repellency such as less than about 7 kPa, less than about 5 kPa, or less than about 3 kPa). Such filter media may be useful for certain liquid filtration (e.g., hydraulic) applications.

The water absorbance of a filter media, fiber web, or other article may also vary. In some embodiments, water absorbance is between about 5 and about 500%, between about 10 and about 400%, between about 25 and about 300%, between about 5 and about 200%, between about 5 and about 100%, between about 100 and about 300%, or between about 200 and about 500%. Water absorbance (also known as water pick up) is determined by measuring the percentage difference in weight gain of samples before and after being immersed in water at 25° C. for 24 hours. After the immersion, samples are patted down with a towel to remove any water on the sample's surface before being weighed.

It should be appreciated that a filter media, fiber web, or other article may have varying values or ranges of water repellency, water absorbance, pressure drop, gamma value, basis weight, thickness, and surface area, such as those values and ranges described herein, depending upon the requirements of a desired application. Furthermore, one or more of a binder, dendrimer, water repellant (e.g., fluorinated species), and polysiloxane, such as the ones described herein, can be included in the filter media or article in various combinations and amounts, such as the amounts or ranges described herein, to tailor the properties or performance characteristics of the filter media or article.

For example, one article may include a fiber web comprising a dendrimer, a fluorinated polymer, and a plurality of glass fibers having an average diameter between about 0.01 and about 10 microns. The fiber web may have a basis weight between about 30 and about 400 gsm, an overall thickness between about 100 microns and about 5000 microns, and an overall pressure drop between about 5 Pa and about 700 Pa.

In another example, an article may include a fiber web comprising a dendrimer, a water repellant, and a plurality of glass fibers having an average diameter between about 0.01 and about 10 microns. The fiber web may have a basis weight between about 30 and about 400 gsm, an overall thickness between about 100 microns and about 5000 microns, an overall pressure drop between about 5 Pa and about 700 Pa, and a water repellency of between about 1 kPa and about 20 kPa.

In yet another example, an article may include a fiber web comprising a plurality of glass fibers having an average diameter between about 0.01 and about 10 microns, and a water repellent comprising a fluorinated species comprising the formula $—C_nF_mR_y$, where n is an integer less than or equal to 6, m is an integer greater than 1, R is zero, an atom or a group of atoms (e.g., hydrogen, oxygen, sulfur, nitrogen, carbon or an endgroup described herein), and y is an integer greater than or equal to 0. The fiber web may have a basis weight between about 30 and about 400 gsm, an overall thickness between about 100 microns and about 5000 microns, an overall pressure drop between about 5 Pa and about 700 Pa, a water repellency between about 1 kPa and about 20 kPa, and a $-\log[(\text{DOP penetration }\%/100)/\text{pressure drop})]\times 100$ value of at least 8 determined using DOP aerosol particles approximately 0.3 microns in diameter at a media face velocity of approximately 5.3 cm/sec.

In some embodiments, an article described above or herein may be an air filter medium or element. In other cases, the article may be a liquid filter medium or element. The fiber web may have, for example, a pressure drop between about 8 and about 650 Pa, or within another range described herein. The fiber web may have a water repellency between about 1 and about 15 kPa, or within another range described herein. In some cases, the water repellency is greater than about 1.5 kPa, greater than about 5 kPa, or greater than about 9.5 kPa. In some cases, the fiber web may have a basis weight between about 60 and about 100 gsm, or within another range described herein.

As described herein, if the fiber web includes a dendrimer, the dendrimer may be associated with the fiber web in any suitable configuration. In some embodiments, the dendrimer is coated on at least a portion of the plurality of glass fibers. In some instances, the dendrimer comprises a crosslinking group.

The plurality of glass fibers may have an average diameter within any suitable range, and in some embodiments is between about 0.4 and about 6 microns. In some cases, about 3% to about 35% of the plurality of glass fibers are chopped glass fibers.

In some embodiments, the fiber web includes a fluorinated species. The fluorinated species may be, for example, a fluorinated polymer. In some instances, the fluorinated polymer comprises repeat units comprising at least one fluorine atom. The fluorinated polymer may be, for example, a fluorinated copolymer, e.g., a fluoroacrylate. In certain embodiments, the fluorinated polymer comprises a perfluoroalkyl group. In some particular embodiments, the fluorinated polymer comprises the formula $—C_nF_mR_y$, where n is an integer less than or equal to 6, m is an integer greater than 1, R is zero, an atom or a group of atoms, and y is an integer greater than or equal to 0. For example, the fluorinated polymer may comprise the formula $—C_6F_{13}$.

Advantageously, the use of certain fluorinated species comprising the formula $—C_nF_mR_y$ (where n is an integer less than or equal to 6, m is an integer greater than 1, and R is zero, an atom or a group of atoms) in some filter media, fiber webs, or articles described herein may be more environmentally friendly than certain fluorinated species comprising the same formula but where n is an integer greater than or equal to 8. Additionally, the filter media, fiber web, or article including a fluorinated species comprising the formula $—C_nF_mR_y$, where n is an integer less than or equal to 6, may have a comparable value of gamma (i.e., a $-\log[(\text{DOP penetration }\%/100)/\text{pressure drop, Pa})]\times 100\times 9.8$ value) compared to a filter media, fiber web, or article including a fluorinated species having the same formula but where n is an integer greater than or equal to 8.

In some particular embodiments, the use of a fluorinated species comprising the formula $—C_nF_mR_y$ (where n is an integer less than or equal to 6, m is an integer greater than 1, and R is zero, an atom or a group of atoms) leads to a first filter media, fiber web, or article having a lower gamma value and/or a lower water repellency than a second filter media, fiber web, or article including a fluorinated species having the same formula but where n is an integer greater than or equal to 8. With the addition of a dendrimer or other suitable additive to the first filter media, fiber web, or article, the water repellency may increase. However, in some cases the gamma value of the first filter media, fiber web, or article may not improve or may even decrease upon the addition of the dendrimer or other suitable additive. To improve the gamma value, a polysiloxane may be added to the first filter media, fiber web, or article. Thus, in some embodiments, both a polysiloxane or other suitable additive and a dendrimer may be added to certain filter media, fiber webs, or articles described herein to obtain both high gamma values and good water repellency properties. Such components may allow the first filter media, fiber web, or article (including a fluorinated species comprising the formula $—C_nF_mR_y$, where n is an integer less than or equal to 6) to have a gamma value and/or a water repellency value comparable to or greater than that of the second filter media, fiber web, or article (including a fluorinated species comprising the formula $—C_nF_mR_y$, where n is an integer greater than or equal to 8). In some cases, both the gamma value and water repellency value of the first filter media, fiber web, or article are comparable to or greater than those values of the second filter media, fiber web, or article. It should be understood, however, that high gamma values and water repellency properties can be obtained by the addition of other combinations of components described herein, and need not include both a dendrimer and polysiloxane in all embodiments.

The filter media, fiber web, or other articles may be produced using processes based on known techniques. As noted above, the filter media or fiber web can be produced using nonwoven production techniques. Thus, the filter media or fiber web may include a nonwoven web in some embodiments. In some cases, the filter media or fiber web are produced using a wet laid processing technique. In general, when the filter media comprises a glass fiber web, the glass fibers (e.g., chopped strand and/or microglass fibers) may be mixed together, optionally with any synthetic fibers, to provide a glass fiber slurry. For example, the slurry may be an aqueous-based slurry. In some embodiments, each of the different types of fibers (e.g., the chopped strand glass fibers, microglass fibers, and/or synthetic fibers) are stored separately in various holding tanks prior to being mixed together. In some embodiments, these fibers are processed through a pulper before being mixed together. In some embodiments, combinations of chopped strand glass fibers, microglass fibers, and/or synthetic fibers are processed through a pulper and/or a holding tank prior to being mixed together. As discussed above, microglass fibers may include fine microglass fibers and coarse microglass fibers.

It should be appreciated that any suitable method for creating a glass fiber slurry may be used. In some cases, one or more additives such as those described herein are added to the slurry. For example, one or more of a dendrimer, a water repellent (e.g., a fluorinated species), and another additive may be added to the slurry. The temperature may also be adjusted to a suitable range, for example, between 33° F. and 100° F. (e.g., between 50° F. and 85° F.). In some embodiments, the temperature of the slurry is maintained. In some cases, the temperature is not actively adjusted. In other embodiments, one or more of a dendrimer, a water repellent (e.g., a fluorinated species), and another additive may be added to a glass fiber sheet.

In some embodiments, the wet laid process uses similar equipment as a conventional papermaking process, which includes a hydropulper, a former or a headbox, a dryer, and an optional converter. For example, the slurry may be prepared in one or more pulpers. After appropriately mixing the slurry in a pulper, the slurry may be pumped into a headbox, where the slurry may or may not be combined with other slurries or additives may or may not be added. The slurry may also be diluted with additional water such that the final concentration of fiber is in a suitable range, such as for example, between about 0.1% to 0.5% by weight.

In some cases, pH of the glass fiber slurry may be adjusted as desired. In some embodiments, the pH of the glass fiber slurry may range from between about 2 and about 4, or between about 2.5 and about 3.5. In some embodiments, the pH of the glass fiber slurry is generally about 2.7 or about 2.8. In some cases, acidity in the glass fiber slurry may provide for increased van der Waals interaction between glass fibers within the slurry. If desired, a lower pH of the glass fiber slurry may be provided to increase van der Waals interaction between glass fibers as compared to that of a glass fiber slurry at a more neutral pH.

Before the slurry is sent to a headbox, the slurry may be passed through centrifugal cleaners for removing unfiberized glass or shot. The slurry may or may not be passed through additional equipment such as refiners or deflakers to further enhance the dispersion of the fibers. Fibers may then be collected on a screen or wire at an appropriate rate.

In some embodiments, the process then involves introducing a binder resin into the pre-formed glass fiber web. In some embodiments, as the glass fiber web is passed along an appropriate screen or wire, different components included in the binder (e.g., optional soft binder, optional hard binder, optional dendrimer, optional water repellent, optional polysiloxane), which may be in the form of separate emulsions, are added to the glass fiber web using a suitable technique. As described herein, such optional components may be appropriately added to the glass fiber web along with the binder or independently from the binder. In some cases, each component of the binder resin is mixed as an emulsion prior to being combined with the other components and/or glass fiber web. For example, a fluorinated species such as a fluorocarbon may be provided as an emulsion or other suitable matrix prior to mixing with the binder and incorporation into the glass fiber web. The fluorinated species, if added, may be added along with a dendrimer in some instances. In some embodiments, the components included in the binder along with the fluorinated species and/or dendrimer may be pulled through the glass fiber web using, for example, gravity and/or vacuum. Additionally or alternatively, one or more of the components included in the binder resin, the fluorinated species, and/or the dendrimer may be diluted with softened water and pumped into the glass fiber web.

In some embodiments when a polysiloxane is used, the polysiloxane may be added after the binder and optional fluorinated species and optional dendrimer have been added. For example, the polysiloxane may be introduced into the glass fiber web in a downstream step after the binder, optional fluorinated species, and optional dendrimer have already been introduced into the web. In another example, the polysiloxane may be introduced into the glass fiber web along with the binder and optional fluorinated species and optional dendrimer, where the polysiloxane is added last in the process just before the addition point to the fiber web.

After the binder and any additional components are incorporated into the glass fiber web, the wet-laid fiber web may be appropriately dried. In some embodiments, the wet-laid fiber web may be drained. In some embodiments, the wet-laid fiber web may be passed over a series of drum dryers to dry at an appropriate temperature (e.g., about 275° F. to 325° F., or any other temperature suitable for drying). For some cases, typical drying times may vary until the moisture content of the composite fiber web is as desired. In some embodiments, drying of the wet-laid fiber web may be performed using infrared heaters. In some cases, drying will aid in curing the fiber web. In addition, the dried fiber web may be appropriately reeled up for downstream filter media processing.

Different layers of glass fiber webs may be combined to produce filter media based on desired properties. For example, in some embodiments, a relatively coarser pre-filter glass fiber web may be built alongside of a relatively finer glass fiber web to form a multi-phase (e.g., dual phase) filter media. Multi-phase fiber media may be formed in an appropriate manner. As an example, a filter media may be prepared by a wet laid process where a first dispersion (e.g., a pulp) containing a glass fiber slurry (e.g., glass fibers in an aqueous solvent such as water) is applied onto a wire conveyor in a papermaking machine (e.g., fourdrinier or rotoformer), forming a first phase. A second dispersion (e.g., another pulp) containing another glass fiber slurry (e.g., glass fibers in an aqueous solvent such as water) is then applied onto the first phase. Vacuum is continuously applied to the first and second dispersions of fibers during the above process to remove solvent from the fibers, resulting in a filter media having a first phase and a second phase. The filter media formed is then dried. It can be appreciated that filter media may be suitably tailored not only based on the components of each glass fiber web, but also according to the effect of using multiple glass fiber webs of varying characteristics in appropriate combination. Additionally, it should be understood that two or more layers may be added together using other processes such as lamination, co-pleating, or collation (i.e., placing two layers directly adjacent one another and keeping the layers together by pressure).

Filter media, fiber webs, or other articles having at least 2, at least 3, at least 4, at least 5, or at least 6 layers can be formed using methods described herein and/or methods known to those of ordinary skill in the art. In some embodiments, at least one layer of a filter media or article includes a dendrimer, a water repellent (e.g., a fluorinated species), a polysiloxane, or a combination thereof. In some cases, at least 2, at least 3, at least 4, at least 5, or at least 6 layers of the filter media includes a dendrimer, a water repellent (e.g., a fluorinated species), a polysiloxane, or a combination thereof.

After formation, the filter media may be further processed according to a variety of known techniques. For example, the filter media may be pleated and used in a pleated filter element. In some embodiments, filter media, or various layers thereof, may be suitably pleated by forming score lines at appropriately spaced distances apart from one another, allowing the filter media to be folded. It should be appreciated that any suitable pleating technique may be used.

It should be appreciated that the filter media may include other parts in addition to the glass fiber web. In some embodiments, the filter media may include more than one glass fiber web, e.g., at least 2, at least 3, at least 4 layers, at least 5, or at least 6 layers of glass fiber web. Optionally, at least 1, at least 2, at least 3, at least 4, at least 5, or at least 6 of the layers may be water repellant. In some embodiments, further processing includes incorporation of one or more structural features and/or stiffening elements. The glass fiber web(s) may be combined with additional structural features such as polymeric and/or metallic meshes. For example, a screen backing may be disposed on the filter media, providing for further stiffness. In some cases, a screen backing may aid in retaining the pleated configuration. For example, a screen backing may be an expanded metal wire or an extruded plastic mesh.

The filter media may be incorporated into a variety of suitable filter elements for use in various applications including gas and liquid filtration. Filter media suitable for gas filtration may be used for ASHRAE, HEPA, and ULPA filtration applications. For example, the filter media may be used in heating and air conditioning ducts. In another example, the filter media may be used for respirator and face mask applications (e.g., surgical face masks, industrial face masks and industrial respirators). In some embodiments, certain filter media described herein are used in applications where high water repellency is desired. The filter media may also be used in combination with other filters as a pre-filter, for example, acting as a pre-filter for high efficiency filter applications (e.g., HEPA). Filter elements may have any suitable configuration as known in the art including bag filters and panel filters.

In some cases, the filter element includes a housing that may be disposed around the filter media. The housing can have various configurations, with the configurations varying based on the intended application. In some embodiments, the housing may be formed of a frame that is disposed around the perimeter of the filter media. For example, the frame may be thermally sealed around the perimeter. In some cases, the frame has a generally rectangular configuration surrounding all four sides of a generally rectangular filter media. The frame may be formed from various materials, including for example, cardboard, metal, polymers, or any combination of suitable materials. The filter elements may also include a variety of other features known in the art, such as stabilizing features for stabilizing the filter media relative to the frame, spacers, or any other appropriate feature.

As noted above, in some embodiments, the filter media can be incorporated into a bag (or pocket) filter element. A bag filter element may be formed by any suitable method, e.g., by placing two filter media together (or folding a single filter media in half), and mating three sides (or two if folded) to one another such that only one side remains open, thereby forming a pocket inside the filter. In some embodiments, multiple filter pockets may be attached to a frame to form a filter element. It should be understood that the filter media and filter elements may have a variety of different constructions and the particular construction depends on the application in which the filter media and elements are used. In some cases, a substrate may be added to the filter media.

The filter elements may have the same property values as those noted above in connection with the filter media. For example, the above-noted gamma values, pressure drop, water repellency, water absorbance, thicknesses, and/or basis weight may also be found in filter elements.

During use, the filter media mechanically trap contaminant particles on the fiber web as fluid (e.g., air) flows through the filter media. The filter media need not be electrically charged to enhance trapping of contamination. Thus, in some embodiments, the filter media are not electrically charged. However, in some embodiments, the filter media may be electrically charged.

EXAMPLES

The following non-limiting examples describe filter media that have been made according to aspects discussed herein.

Example 1

This example describes a method for forming a filter media (including a $C_8$ fluoroacrylate copolymer including the formula $—C_8F_{17}$) having improved water repellent properties and gamma values according to one set of embodiments.

Chopped strand glass fibers (average fiber diameter of 6 microns, 6% by dry weight of the fiber web) and microglass fibers (average fiber diameter of 0.8 microns, 89% by dry weight of the fiber web) were fed into separate pulpers with water and transferred to respective holding tanks. The chopped strand glass fibers and microglass fibers were subsequently blended together to form a glass fiber slurry. Separate emulsions of binder (including a soft binder from Rohm and Haas, Eco32S, 47% by dry weight of the total binder resin, and a hard binder from Rohm and Haas, HF-05A, 15% by dry weight of the total binder resin), dendrimer (RucoDry DHY, a cationic dendrimer in a hydrocarbon matrix emulsion having 10% active solids, 15% by dry weight of the total binder resin), and fluoroacrylate copolymer (a $C_8$ fluoroacrylate copolymer from Repearl, F-35 Fluorocarbon, 23% by dry weight of the total binder resin) diluted with softened water were formed and kept in holding tanks. The glass fiber slurry was placed on a carrier wire and subsequently subject to gravity and a vacuum for draining the water from the slurry to form a glass fiber web. The glass fiber web was then moved toward a region for pumping the binder, dendrimer, and fluoroacrylate copolymer emulsions through the glass fiber web. Each of the binder, dendrimer, and fluoroacrylate copolymer emulsions were filtered and pumped toward the glass fiber web in the same feed line. The binder, dendrimer, and fluoroacrylate copolymer were subsequently pulled through the glass fiber web using gravity and a vacuum so as to form a relatively even distribution of the binder resin and other components throughout the glass fiber web. The glass fiber web was then dried with dryer cylinders and infrared heaters and reeled up for further testing and processing. The binder resin as a whole was 5% dry weight of the fiber web.

Five samples were cut from the glass fiber web and average values of the five samples were measured. An average pressure drop of 327 Pa was measured across the filter media. The average % DOP was measured to be 0.0089%, measured using DOP aerosol particles approximately 0.3 microns in diameter at a media face velocity of approximately 5.3 cm/sec. The average gamma value was measured to be 12.2. The average water repellency was measured to be 13.5 kPa, which was performed according to the standard BS EN 20811:1992 (British). The average % water absorbance was measured to be 161%. The average basis weight was measured to be 83.3 g/m$^2$.

This example shows that the water repellency and gamma value of the filter media improved compared to Example 2 by adding a dendrimer to the fiber web.

Example 2

A filter media used as a control sample was produced in the same manner as described in Example 1, except without the addition of dendrimer. Different proportions of hard and soft binders were also used (a soft binder from Rohm and Haas, Eco32S, 58% by dry weight of the total binder resin, and a hard binder from Rohm and Haas, HF-05A, 19% by dry weight of the total binder resin), with 23% fluorocarbon by dry weight of the total binder resin.

An average pressure drop of 315 Pa was measured across the filter media. The average % DOP was measured to be 0.016%, measured using DOP aerosol particles approximately 0.3 microns in diameter at a media face velocity of approximately 5.3 cm/sec. The average gamma value was measured to be 11.8. The average water repellency was measured to be 10 kPa. The average % water absorbance was measured to be 150%. The average basis weight was measured to be 81 g/m$^2$.

Example 3

This example describes a method for forming a filter media (including a C$_8$ fluoroacrylate copolymer) having improved gamma values according to one set of embodiments.

The filter media were produced in the same manner as Example 1, except a polysiloxane (Synthebond SF-30 from Hexion Specialty Chemicals, 6% by dry weight of the total binder resin) diluted with water was added in the same feed line as the binder, dendrimer and fluoroacrylate copolymer, but further down the line after the other components. The amount of binder was reduced to account for the addition of polysiloxane so that the total dry weight of binder resin in the web remained at 5%.

Five samples were cut from the glass fiber web and average values of the five samples were measured. An average pressure drop of 319 Pa was measured across the filter media. The average % DOP was measured to be 0.0032%, measured using DOP aerosol particles approximately 0.3 microns in diameter at a media face velocity of approximately 5.3 cm/sec. The average gamma value was measured to be 13.8. The average water repellency was measured to be 11.9 kPa. The average % water absorbance was measured to be 160%. The average basis weight was measured to be 82.3 g/m$^2$.

This example shows that the water repellency and gamma values of the filter media improved compared to Example 2 by adding a dendrimer and a polysiloxane to the fiber web.

Example 4

This example describes a method for forming a filter media (including a C$_8$ fluoroacrylate copolymer) having good water repellency properties and a high gamma value according to one set of embodiments. This example was used as a control for Example 5 to compare the differences between the performance characteristics of the filter media when different methods of adding the binder resin to the fiber web were used.

The filter media was produced using the method described in Example 1, except the following components were used: a 2:1 mixture of a soft binder from Craymul, 1222S, to a hard binder from Rohm and Haas, HF-05A, 85% by dry weight of the total binder resin) and a C$_8$ fluoroacrylate copolymer (Repearl F35 from Mitsubishi, 15% by dry weight of the total binder resin). The filter media did not include any dendrimer or polysiloxane.

An average pressure drop of 305 Pa was measured across the filter media. The average % DOP was measured to be 0.015%, measured using DOP aerosol particles approximately 0.3 microns in diameter at a media face velocity of approximately 5.3 cm/sec. The average gamma value was measured to be 12.3. The average water repellency was measured to be 7.6 kPa. The average basis weight was measured to be 78 g/m$^2$.

Example 5

This example describes a method for forming a filter media (including a C$_8$ fluoroacrylate copolymer) having good water repellency properties and a high gamma value according to one set of embodiments.

To form a glass fiber web, chopped strand glass fibers (average fiber diameter of 6 microns, 6% by dry weight of the fiber web) and microglass fibers (average fiber diameter of 0.8 microns, 89% by dry weight of the fiber web) were fed into separate pulpers with water and transferred to respective holding tanks. The chopped strand glass fibers and microglass fibers were subsequently blended together to form a glass fiber slurry. The glass fiber slurry was placed on a carrier wire and subsequently subject to gravity and a vacuum for draining the water from the slurry to form a glass fiber web. The glass fiber web was then dried with dryer cylinders and infrared heaters and reeled up for further testing and processing.

To form a binder resin, separate emulsions of binder (including a 2:1 mixture of a soft binder from Craymul, 1222S, to a hard binder from Rohm and Haas, HF-05A, 85% by dry weight of the total binder resin) and a C$_8$ fluoroacrylate copolymer (AG955, from Repearl F35 from Mitsubishi, 15% by dry weight of the total binder resin) were mixed together in 1 L of water. The resulting mixture was added to a tray approximately 50 cm long, 40 cm wide, and 15 cm deep.

The glass fiber web was cut into handsheets approximately 8½ by 11 inches in size, and then was placed onto a wire and drawn two times through the tray containing the binder resin mixture. The excess liquid was then drained from the fiber web. The fiber web was dried in a Werner Mathis oven at 150° C. for 5 minutes. The target add-on binder was 5% by total weight of the fiber web.

A pressure drop of 286 Pa was measured across the filter media. The % DOP was measured to be 0.027%, measured using DOP aerosol particles approximately 0.3 microns in diameter at a media face velocity of approximately 5.3 cm/sec. The gamma value was measured to be 12.2. The water repellency was measured to be 4.7 kPa. The basis weight was measured to be 78 g/m$^2$.

This example shows that a good gamma value and good water repellency properties can be achieved for a filter media by adding a C$_8$ fluorocarbon to a binder resin. It was observed that the water repellency value for this example was lower than the values obtained in Examples 1-4 due to the particular process used to add the binder resin to the fiber web. Specifically, the type and amounts of components used in the binder resin in this example were the same as those used in Example 4, but the methods of adding the binder resin to the filter media differed, and the water repellency value measured in this example was lower than that measured in Example 4. Without wishing to be bound by any theory, the inventors believe that this difference in water repellency may be the result of different drying and curing conditions between the two processes. It is believed, therefore, that if the binder resin components in Examples 6-9 were added to the filter media using the process described in Example 1, an increase in water repellency value would be achieved.

Example 6

This example describes a method for forming a filter media (including a $C_6$ fluoroacrylate copolymer including the formula —$C_6F_{13}$) having a moderate gamma value and moderate water repellency properties according to one set of embodiments. The filter media was produced in the same manner as described in Example 5, except the fluorocarbon used was a $C_6$ fluoroacrylate copolymer from TG5601 from Unidyne (15% by dry weight of the total binder resin).

A pressure drop of 302 Pa was measured across the filter media. The % DOP was measured to be 0.036%, measured using DOP aerosol particles approximately 0.3 microns in diameter at a media face velocity of approximately 5.3 cm/sec. The gamma value was measured to be 11.2. The water repellency was measured to be 3.2 kPa. The basis weight was measured to be 78 g/m².

Example 7

This example describes a method for forming a filter media (including a $C_6$ fluoroacrylate copolymer) having improved water repellency properties according to one set of embodiments. The filter media was produced in the same manner as described in Example 6, but with the addition of a dendrimer (RucoDry DHY, a cationic dendrimer in a hydrocarbon matrix emulsion having 10% active solids; 15% by dry weight of the total binder resin) and with reduced amounts of binder (75% by dry weight of the total binder resin).

A pressure drop of 299 Pa was measured across the filter media. The % DOP was measured to be 0.041%, measured using DOP aerosol particles approximately 0.3 microns in diameter at a media face velocity of approximately 5.3 cm/sec. The gamma value was measured to be 11.1. The water repellency was measured to be 4.9 kPa. The average basis weight was measured to be 78 g/m².

This example shows that the water repellency of the filter media improved when a dendrimer was added to the fiber web, compared to a sample that did not include a dendrimer (Example 6).

Example 8

This example describes a method for forming a filter media (including a $C_6$ fluoroacrylate copolymer) having an improved gamma value according to one set of embodiments. The filter media was produced in the same manner as described in Example 7, except with the addition of a polysiloxane (Synthebond SF-30 from Hexion Specialty Chemicals, 10% by dry weight of the total binder resin) and with reduced amounts of binder (65% by dry weight of the total binder resin).

A pressure drop of 305 Pa was measured across the filter media. The % DOP was measured to be 0.017%, measured using DOP aerosol particles approximately 0.3 microns in diameter at a media face velocity of approximately 5.3 cm/sec. The gamma value was measured to be 12.1. The water repellency was measured to be 2.8 kPa. The average basis weight was measured to be 78 g/m².

This example shows that the gamma value of the filter media improved when a polysiloxane was added to the fiber web, compared to a sample that did not include a polysiloxane (Examples 6 and 7). This example further shows that comparable gamma values can be obtained using a $C_6$ fluoropolymer as with certain filter media including a $C_8$ fluoropolymer (Example 5).

Example 9

This example describes a method for forming a filter media (including a $C_6$ fluoroacrylate copolymer) having an improved gamma value and improved water repellency properties according to one set of embodiments. The filter media was produced in the same manner as described in Example 8, except a greater amount of polysiloxane was used (15% by dry weight of the total binder resin), a greater amount of dendrimer was used (45% by dry weight of the total binder resin), and a reduced amount of binder was used (25% by dry weight of the total binder resin). The percentage of fluoroacrylate copolymer remained the same as in Example 8.

A pressure drop of 303 Pa was measured across the filter media. The % DOP was measured to be 0.018%, measured using DOP aerosol particles approximately 0.3 microns in diameter at a media face velocity of approximately 5.3 cm/sec. The gamma value was measured to be 12.1. The water repellency was measured to be 6.5 kPa. The average basis weight was measured to be 78 g/m².

This example shows that the gamma value of the filter media improved when a polysiloxane was added to the fiber web, compared to a sample that did not include a polysiloxane (Examples 6 and 7). Additionally, this example demonstrates that the water repellency properties of the filter media can be improved by adjusting the relative amounts of dendrimer, polysiloxane, fluorocarbon, and binder. In particular, the water repellency properties improved compared to the filter media formed in Example 8 when larger amounts of dendrimer and polysiloxane were used. This example further shows that a comparable gamma value and enhanced water repellency properties can be obtained using a $C_6$ fluoropolymer compared to certain filter media including a $C_8$ fluoropolymer (Example 5).

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An article, comprising:
    a fiber web comprising a dendrimer, a fluorinated polymer, and a plurality of glass fibers having an average diameter between about 0.01 and about 10 microns,
    wherein the fiber web has a basis weight between about 30 and about 400 gsm, an overall thickness between about 100 microns and about 5000 microns, and an overall pressure drop between about 5 Pa and about 700 Pa.

2. The article of claim 1, wherein the fluorinated polymer comprises repeat units comprising at least one fluorine atom.

3. The article of claim 1, wherein the fluorinated polymer is a fluorinated copolymer.

4. The article of claim 1, wherein the fluorinated polymer is a fluoroacrylate.

5. The article of claim 1, wherein the fluorinated polymer comprises a perfluoroalkyl group.

6. The article of claim 1, wherein the fluorinated polymer comprises the formula —$C_nF_mR_y$, where n is an integer less than or equal to 6, m is an integer greater than 1, R is zero, an atom or a group of atoms, and y is an integer greater than or equal to 0.

7. The article of claim 6, wherein the fluorinated polymer comprises the formula —$C_6F_{13}$.

8. The article of claim 1, wherein the dendrimer is coated on at least a portion of the plurality of glass fibers.

9. The article of claim 1, wherein the dendrimer comprises a crosslinking group.

10. The article of claim 1, wherein the fiber web has a pressure drop between about 8 and about 650 Pa.

11. The article of claim 1, wherein the fiber web has a water repellency between about 1 and about 15 kPa.

12. The article of claim 1, wherein the fiber web has a water repellency of greater than about 9.5 kPa.

13. The article of claim 1, wherein the fiber web has a water repellency of greater than about 5 kPa.

14. The article of claim 1, wherein the fiber web has a water repellency of greater than about 1.5 kPa.

15. The article of claim 1, wherein the fiber web has a basis weight between about 60 and about 100 gsm.

16. The article of claim 1, wherein the plurality of glass fibers have an average diameter between about 0.4 and about 6 microns.

17. The article of claim 1, wherein about 3% to about 35% of the plurality of glass fibers are chopped glass fibers.

18. The article of claim 1, wherein the article is an air filter medium or element.

19. The article of claim 1, wherein the fiber web further comprises a polysiloxane.

20. A method, comprising:
passing a fluid through a filter media comprising a fiber web comprising a dendrimer, a fluorinated polymer, and a plurality of glass fibers having an average diameter between about 0.01 and about 10 microns,
wherein the fiber web has a basis weight between about 30 and about 400 gsm, an overall thickness between about 100 microns and about 5000 microns, and overall pressure drop between about 5 Pa and about 700 Pa.

21. An article, comprising:
a fiber web comprising a dendrimer, a water repellant, and a plurality of glass fibers having an average diameter between about 0.01 and about 10 microns,
wherein the fiber web has a basis weight between about 30 and about 400 gsm, an overall thickness between about 100 microns and about 5000 microns, an overall pressure drop between about 5 Pa and about 700 Pa, and a water repellency of between about 1 kPa and about 20 kPa.

22. The article of claim 21, wherein the water repellant includes at least one fluorine atom.

23. The article of claim 21, wherein the water repellant comprises a fluorinated polymer having repeat units comprising at least one fluorine atom.

24. The article of claim 21, wherein the water repellant comprises a fluorinated copolymer.

25. The article of claim 21, wherein the plurality of glass fibers have an average diameter between about 0.4 and about 6 microns.

26. The article of claim 21, wherein the dendrimer comprises a crosslinking group.

27. The article of claim 21, wherein the fiber web further comprises a polysiloxane.

28. The article of claim 21, wherein the fiber web has a water repellency of greater than about 9.5 kPa and up to about 20 kPa.

29. The article of claim 21, wherein the fiber web has a water repellency of greater than about 5 kPa and up to about 20 kPa.

30. The article of claim 21, wherein the fiber web has a water repellency of greater than about 1.5 kPa and up to about 20 kPa.

31. The article of claim 21, wherein the water repellant comprises a silane, a siloxane, a silicone, or an alkylketene dimer.

32. The article of claim 21, wherein the water repellant comprises a fluorinated polymer, and the fluorinated polymer comprises the formula —$C_nF_mR_y$, where n is an integer less than or equal to 6, m is an integer greater than 1, R is zero, an atom or a group of atoms, and y is an integer greater than or equal to 0.

33. The article of claim 32, wherein the fluorinated polymer comprises the formula —$C_6F_{13}$.

34. The method of claim 20, wherein the fluorinated polymer comprises repeat units comprising at least one fluorine atom.

35. The method of claim 20, wherein the fluorinated polymer comprises the formula —$C_nF_mR_y$, where n is an integer less than or equal to 6, m is an integer greater than 1, R is zero, an atom or a group of atoms, and y is an integer greater than or equal to 0.

36. The method of claim 20, wherein the fiber web has a water repellency of greater than about 9.5 kPa.

37. The method of claim 36, wherein the dendrimer is coated on at least a portion of the plurality of glass fibers.

38. The method of claim 37, wherein the dendrimer comprises a crosslinking group.

39. The method of claim 20, wherein the fiber web further comprises a polysiloxane.

40. The method of claim 20, wherein the plurality of glass fibers have an average diameter between about 0.4 and about 6 microns.

41. The method of claim 20, wherein about 3% to about 35% of the plurality of glass fibers are chopped glass fibers.

42. The article of claim 1, wherein the fiber web comprises a plurality of synthetic fibers.

* * * * *